May 27, 1941.  J. A. CASH  2,243,668
CUTTING TABLE
Filed Oct. 26, 1938  3 Sheets-Sheet 1
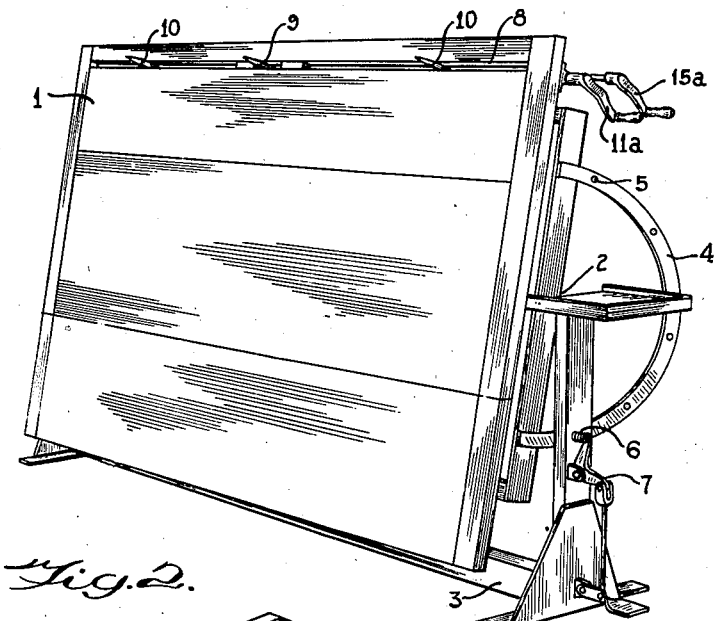
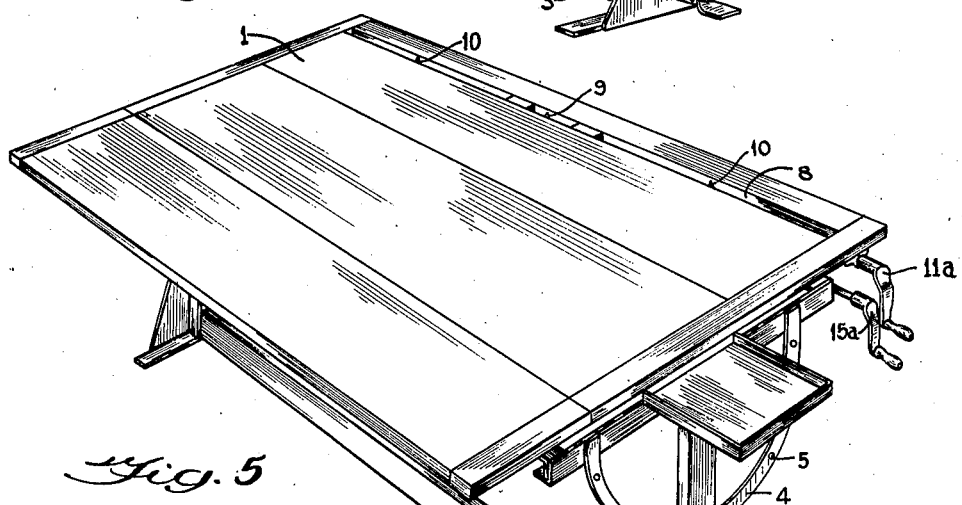
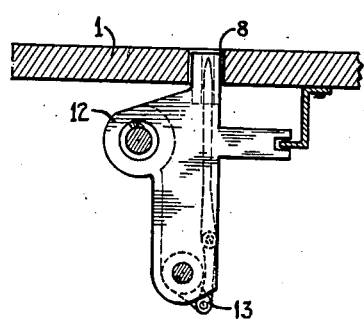
Inventor
JAMES A. CASH
By Arthur F. Robert
Attorney

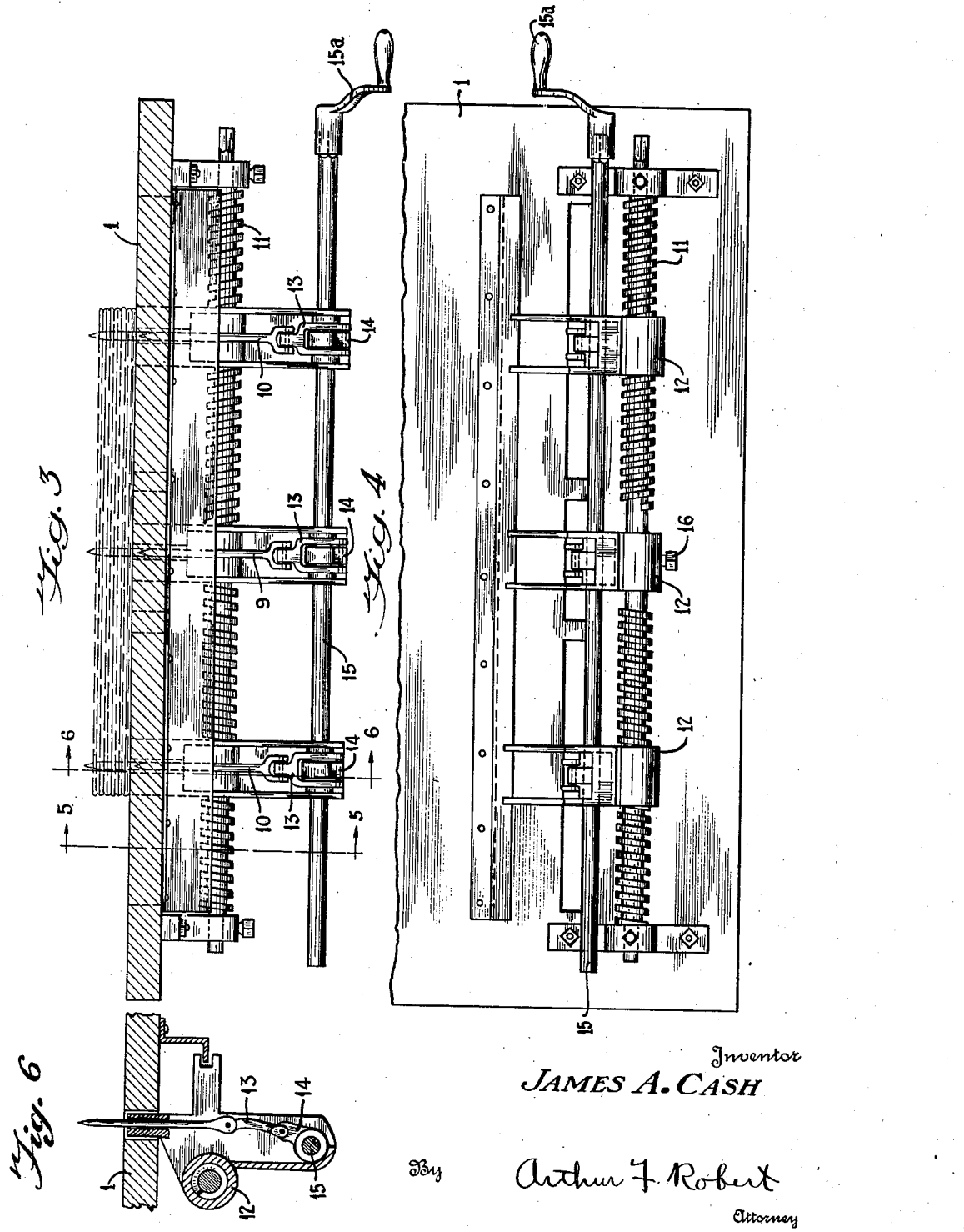

May 27, 1941.　　　J. A. CASH　　　2,243,668
CUTTING TABLE
Filed Oct. 26, 1938　　　3 Sheets-Sheet 3
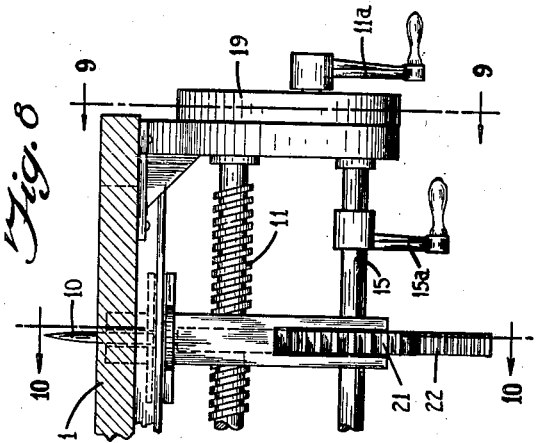
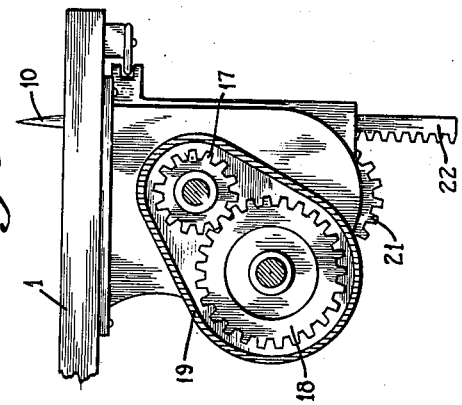
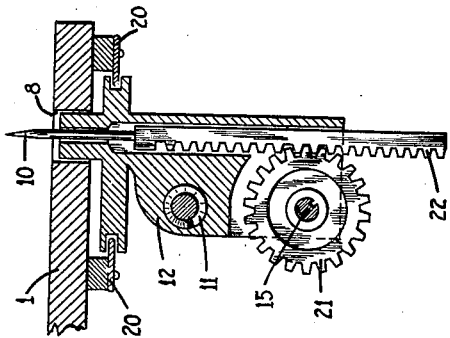
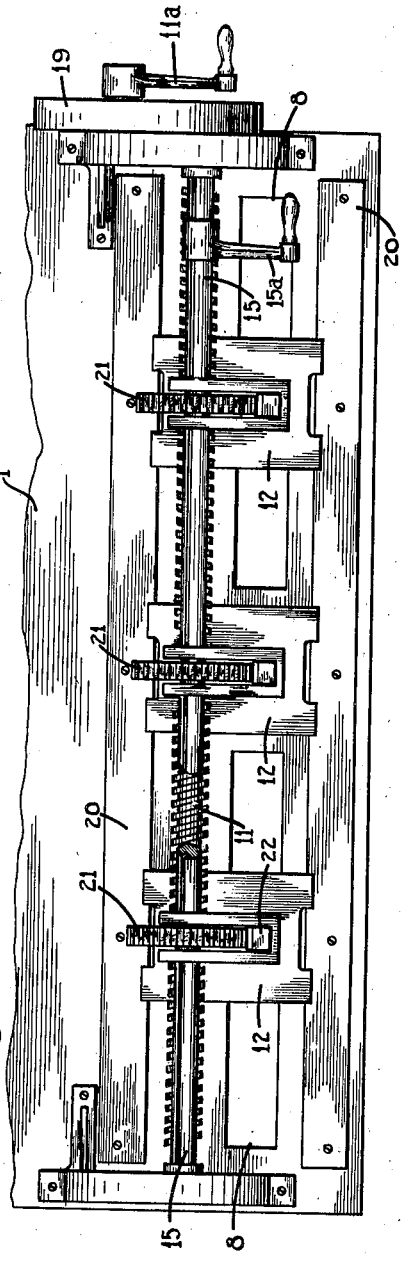
Inventor
JAMES A. CASH
By Arthur F. Robert
Attorney Patented May 27, 1941

2,243,668

UNITED STATES PATENT OFFICE 2,243,668

CUTTING TABLE

James A. Cash, Louisville, Ky., assignor to Fred Franke & Co., Louisville, Ky., a corporation of Kentucky Application October 26, 1938, Serial No. 237,027

6 Claims. (Cl. 164—78)

This invention relates to cutting tables on which superposed layers of fabric are built up and then simultaneously cut to a desired size or pattern. Cutting tables are largely used in bedding factories in cutting ticks, pillow cases and other articles used in the manufacture of bedding. Such tables are commonly provided along one edge with a plurality of laterally spaced projecting pins, the lateral spacings of which may be varied at will to provide a "width" of desired size between end or terminal pins.

In use, the pins are laterally adjusted to the width desired, and the table tilted with its pin-carrying margin uppermost. One corner of the fabric to be cut is then impaled on one pin and, as the fabric is unrolled from its bolt, its upper edge is stretched, in one direction, over and successively impaled on the remaining pins to form one layer. The fabric is then folded adjacent the last pin and, as the next portion of the bolt is unrolled, it is stretched in the opposite direction over and successively impaled on the pins to form the second layer. Additional layers are formed in like manner to produce a "pile" of desired thickness, after which the table is leveled. Since the pins interfere with the cutting operation, it is necessary to lift the pile from the pins and move it bodily over the table sufficiently to clear the pins. This operation is not only laborious but practically impossible to perform without altering the relative positions of various layers; consequently, the cutting operation must be delayed until the layers are restored as nearly as possible to their initial condition. The moving and re-arranging of the pile not only occasions much inconvenience and delay, but also materially lowers the quality of the work by lessening the accuracy of the cutting operation.

One of the principal objects of this invention is the elimination of the transfer operation; i. e., lifting, moving and re-arranging the uncut pile between pile-forming and cutting operations.

In accordance with the present invention, the elimination of the transfer operation is accomplished by arranging the laterally adjustable pins for withdrawal movement from the projecting position to a concealed position within the top of the table. A further object is to provide a simple form of withdrawal means which does not interfere with the normal operation of the adjusting mechanism by which the lateral spacing of the pins is varied.

Embodiments of the invention are illustrated in the drawings, wherein:

Figure 1 is a perspective view of a cutting table in which the invention is incorporated, the top of the table being tilted and the fabric-engaging pins being projected;

Figure 2 is another perspective view of the same table with the top horizontal and the pins withdrawn;

Figure 3 is a side elevation of the same table removed from its base, this view showing the pin-supporting and moving mechanism;

Figure 4 is a bottom plan view of the pin-supporting and moving mechanism;

Figure 5 is a side elevation of the pin-carrying slides, this elevation being taken along a line corresponding to line 5—5 of Figure 3;

Figure 6 is a vertical section through the slides corresponding to one taken along line 6—6 of Figure 3;

Figure 7 is a bottom plan view of an alternative pin-moving mechanism;

Figure 8 is a fragmentary side elevation taken to one end of the table;

Figure 9 is a section taken along line 9—9 of Figure 8; and

Figure 10 is a section taken along line 10—10 of Figure 8.

The cutting table illustrated is of conventional tilt-top form having a top 1 pivotally secured at 2 to the vertical legs of a base 3. The table-top frame carries, at one end, a rigidly mounted crescent 4 having a series of spaced openings 5 adapted to receive the pin 6 of a base-mounted foot-pedal operated latching member which is generally indicated by the numeral 7. The crescent 4 and latching member 7 cooperate to hold the top of the table in any of a number of positions ranging from the horizontal through various degrees of tilt.

The table contains, along one of its longitudinal or side edges, a slot 8 through which the fabric-engaging pins extend, these pins comprising a central pin 9 and two end or terminal pins 10. The central pin may be fixedly mounted, but preferably is slidably mounted for a small range of movement on either side of its normal position in the center of the table. The end pins 10 are spaced at equal distances from opposite sides of the center pin and are arranged for equal and simultaneous movement toward or away from the center pin. In order to move the end pins simultaneously through equal distances toward or away from the central pin, and thus toward or away from each other, the table is provided on its under side with a screw shaft 11, having a handle 11a. This shaft contains an unthreaded central pin section between oppositely threaded end pin sections. Each pin is connected to its respective section of the screw shaft 11 by means of a slide 12. As shown in the Knight et al. Patent #2,006,074, granted June 25, 1935, the pins have been rigidly mounted to project permanently through the slot beyond the top surface of the table. In accordance with the present invention, the pins 9 and 10 are mounted on the slides 12 for movement between concealed and projecting positions.

Accordingly, the lower end of each pin is pivotally connected to one end of a link 13, the opposite end of which is pivotally connected to the free end of a crank 14. The crank 14 is mounted on a shaft 15 for rotational movement with it and slidable movement along it, while the shaft itself is rotatably mounted on the slides 12.

The crank shaft 15 has a handle 15a which may be manually turned to move the pins simultaneously from one position to the other.

In operation, assuming the pins are concealed, the crank-shaft handle 15a is turned to project the pins. Either before or after that operation, the screw-shaft handle 11a is turned to move the slides 12 of the end pins laterally either toward each other or away from each other to such positions as will place the end pins at desired points equidistant from the center. The slide for the central pin 9 is either positioned in the center or moved slidably to one side or the other of the center and there fixed by the set screw 16. When these operations are completed and the table top tilted, the cutting table is conditioned to receive the fabric. The fabric, as it is unbolted, is impaled on the pins first in one direction and then in the other to build up a desired number of layers. Thereupon, the table is returned to its horizontal position and the crank-shaft handle 15a is operated to withdraw the pins and thus condition the pile of fabric for the cutting operation without necessitating its movement relatively to the table.

An alternative arrangement for moving the pins both laterally and vertically is shown in Figures 7-10 inclusive. In this arrangement, the screw shaft 11 is connected to its handle 11a by a pair of gears 17 and 18 which are arranged at one end of the shaft within a gear housing 19. The slides 12, as before, are threaded to the shaft 11. In addition, they are slidably connected to a pair of opposed guiding or track members 20 mounted on the underside of the table top 1. The tracks 20 guide the slides 12 during the lateral movement of the slides and prevent them from binding during such movement.

The mechanism for withdrawing and projecting the central and end pins 9 and 10, as before, includes a shaft 15 passing through the slides 12. The shaft 15, instead of being mounted on the table through the slides, is now mounted directly on the table with its handle 15a arranged between one of its ends and the adjacent slide. The shaft 15 carries, within each slide 12, a gear 21 which, like crank 14, is connected to the shaft for rotational movement with it and slidable movement along it. Each of the gears 21 engages a rack 22 which is vertically arranged within and slidably mounted on the corresponding slide. The upper ends of the racks for the central and end slides are respectively connected to the central and end pins 9 and 10.

In operation, the pins are laterally adjusted by turning the screw-shaft handle 11a to move the end slides 12 toward or away from each other as the case may be. The central slide 12 may be fixed centrally between the end slides or it may be manually adjusted slightly off center in either direction as desired. The pins 9 and 10 may be projected or withdrawn simply by turning the handle 15a in one direction to raise the racks or in the other direction to lower them. If desired, suitable means may be used to lock the pin-operating shaft in either or both of its extreme positions.

I claim:
1. A cutting table comprising: a table top; slides mounted on said table; pins adapted for linear movement between fabric-engaging and disengaging positions, wherein they respectively extend in projecting and nonprojecting positions relatively to said top; a crank shaft rotatably carried by the table and extending through said slides; and means connecting the pins to the crank shaft to project the pins when the shaft is turned in one direction and to retract them when turned in the opposite direction, said connecting means including for each movable pin, a member mounted on the shaft for rotational movement with it and slidable movement along it, said member extending outwardly from the shaft with its outer portion connected to its pin through interposed means for imparting linear motion to the pin from the rotary motion of said member.

2. A cutting table comprising: a table top; slides mounted on said table; mechanism for simultaneously moving the slides laterally toward or away from each other to vary the distance therebetween; fabric-engaging pins laterally movable with said slides; and a mechanism slidably mounting said pins for longitudinal movement relatively to said slides, said mechanism being operable to move the pins lineally between fabric-engaging and disengaging positions, wherein the pins extend in projecting and nonprojecting relationship relatively to the table top.

3. A cutting table comprising: a table top; slides mounted on said table; pins lineally movable through said slides between positions wherein they are adapted respectively to engage and disengage fabric on said top; a crank shaft rotatably carried by the table and extending transversely of and adjacent to said slides; crank members extending adjacent said slides and mounted on said crank shaft for rotational movement with it and slidable movement along it; and means connecting said crank members to said pins, said means imparting linear motion to the pins between said pin positions from the rotary motion of said crank members when the crank shaft is appropriately rotated.

4. A cutting table comprising: a table top; slides mounted on said table; pins lineally movable through said slides between positions wherein they are adapted respectively to engage and disengage fabric on said top; a crank shaft rotatably carried by the table and extending transversely of and adjacent to said slides; gears extending adjacent said slides and mounted on said crank shaft for rotational movement with it and slidable movement along it; and racks connecting said gears to said pins; said gears and racks cooperating to move the pins between said pin positions when the crank shaft is appropriately rotated.

5. A cutting table comprising: a table top; slides mounted on said table; mechanism for simultaneously moving the slides laterally toward or away from each other to vary the distance therebetween; track members mounted on said table in slidable engagement with said slides to guide the latter during their lateral movement; fabric-engaging pins laterally movable with said slides; and a mechanism mounting said pins for longitudinal movement through said slides, said mechanism being operable to move the pins between fabric-engaging and disengaging positions wherein the pins extend in projecting and non-projecting relationship relatively to the table top.

6. A cutting table comprising: a table top; slides mounted on said table; mechanism for simultaneously moving the slides laterally toward or away from each other to vary the distance therebetween; guide means mounted on the table to guide said slides during the lateral movement; pins laterally movable with said slides and longitudinally movable through said slides between positions wherein they are adapted respectively to engage and disengage fabric placed on said top; a crank shaft rotatably carried by the table and extending transversely of and adjacent to said slides; gears extending adjacent said slides and mounted on said crank shaft for rotational movement with it and slidable movement along it; and racks adjacent said slides connecting said gears to said pins, said gears and racks cooperating to move the pins between said pin positions when the crank shaft is appropriately rotated.

JAMES A. CASH.